(12) United States Patent
Suzuki

(10) Patent No.: US 6,984,334 B2
(45) Date of Patent: Jan. 10, 2006

(54) METHOD OF MANUFACTURING OPTICAL ELEMENT

(75) Inventor: Hiroyuki Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 09/873,999

(22) Filed: Jun. 6, 2001

(65) Prior Publication Data

US 2002/0019136 A1 Feb. 14, 2002

(30) Foreign Application Priority Data

| Jun. 8, 2000 | (JP) | ............................. 2000/172213 |
| Jun. 8, 2000 | (JP) | ............................. 2000/172214 |
| Jun. 6, 2001 | (JP) | ............................. 2001/170785 |

(51) Int. Cl.
*B29D 11/00* (2006.01)

(52) U.S. Cl. ...................................................... 216/24

(58) Field of Classification Search ................. 216/24, 216/25, 26, 85, 94, 96, 97, 98, 100; 134/1; 438/746, 690, 694; 359/642, 900
See application file for complete search history.

(56) References Cited

U.S. PATENT DOCUMENTS

| 4,040,896 | A | * | 8/1977 | Harrington et al. .......... 216/100 |
| 5,334,258 | A | * | 8/1994 | Osano et al. .................. 134/42 |
| 5,468,346 | A | * | 11/1995 | Bruce et al. ................... 216/34 |
| 5,742,026 | A | * | 4/1998 | Dickinson et al. ...... 219/121.69 |
| 6,217,665 | B1 | * | 4/2001 | Suzuki ........................... 134/1 |
| 6,238,479 | B1 | * | 5/2001 | Oba .............................. 117/68 |
| 6,375,551 | B1 | * | 4/2002 | Darcangelo et al. ........... 451/41 |
| 2001/0001686 | A1 | * | 5/2001 | Kishida et al. .............. 428/192 |

FOREIGN PATENT DOCUMENTS

JP            63222023 A   *   9/1988

* cited by examiner

*Primary Examiner*—Parviz Hassanzadeh
*Assistant Examiner*—Roberts Culbert
(74) *Attorney, Agent, or Firm*—Fitzpatrick, Cella, Harper & Scinto

(57) ABSTRACT

In a method of manufacturing an optical element, a substrate is machined, and then a contamination is removed from a surface of the substrate. Also, after the substrate is machined, a deterioration layer in the surface of the substrate is removed.

13 Claims, 3 Drawing Sheets

FIG.3
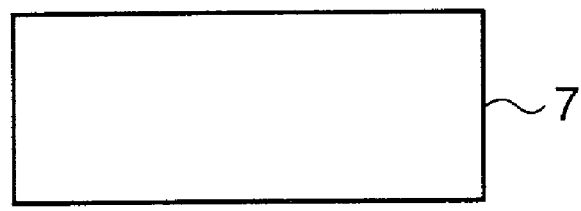
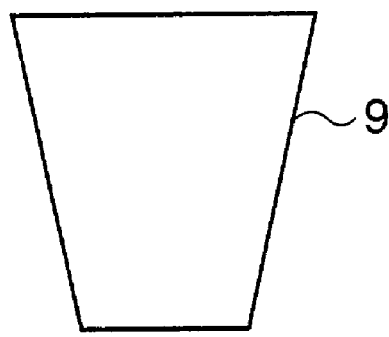
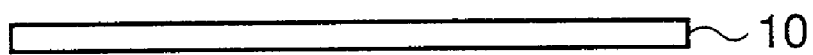

METHOD OF MANUFACTURING OPTICAL ELEMENT

BACKGROUND OF THE INVENTION

1. Field of the Invention

The present invention relates to a method of manufacturing an optical element, including a step of machining and washing a substrate made of $CaF_2$ single crystalline or the like, an exposure apparatus using the optical element, and the optical element washing machine. In particular, the present invention relates to a method of manufacturing a fluoric lens which is used in the case where a high function is required, which is cut from a $CaF_2$ single crystalline substrate and machined, and has a large aperture and high profile irregularity.

2. Related Background Art

Conventionally, an optical element such as a lens made of a fluoride series crystal material such as $CaF_2$ or $MgF_2$ has preferable transmittance in an optical characteristic over an extremely wide wavelength band and low dispersiveness. Thus, this optical element has been used as a high precision lens of which a high function is required, such as a high grade camera lens or a television camera lens.

Also, the optical element such as the lens made of the fluoride series crystal material such as $CaF_2$ or $MgF_2$ has high transmittance with respect to ultraviolet radiation by an excimer laser. Thus, use of such an optical element is started for various optical elements of an illuminating optical system and those of a projection optical system in a projection exposure apparatus using ultraviolet radiation with a wavelength of about 248 nm (KrF excimer laser), ultraviolet radiation with a wavelength of 193 nm (ArF excimer laser), or ultraviolet radiation with a wavelength of 157 nm ($F_2$ excimer laser).

In manufacturing such kind of lens, generally, a wash solution is poured into a wash bath and then a lens (substrate) which has undergone surface machining is immersed therein. In this state, the lens is washed by a ultrasonic cleaning method or the like to remove a contamination such as an organic material (such as oil) or an inorganic particle (such as abrasive) on the surface of the lens. Thus, the reduction in the transmittance of the lens due to the contamination is prevented.

However, it has been found that even if such washing is made, it is still impossible to obtain a lens with predetermined transmittance. One of the reasons is the existence of a deterioration layer on the surface of the substrate, which is produced during the lens machining.

SUMMARY OF THE INVENTION

The object of the present invention is to provide a method of manufacturing an optical element capable of obtaining higher transmittance than that of the conventional optical element.

According to the present invention, there is provided a method of manufacturing an optical element, comprising the steps of: machining a substrate; and removing a deterioration layer from the surface of the substrate after the machining.

According to the present invention, since the manufacturing method includes the stage of removing the deterioration layer on the surface of the substrate, the reduction in the transmittance due to the deterioration layer can be completely prevented or greatly suppressed. Thus, a method of manufacturing an optical element capable of obtaining higher transmittance than that of the conventional one, can be provided.

In embodiments described later, after the machining, removing a contamination from a surface of the substrate is provided.

In embodiments described later, although the surface of the substrate is ultrasonic-washed with an aqueous wash solution to etch the deterioration layer on the surface, the etching time of the deterioration layer by this ultrasonic washing is set such that the surface roughness of the substrate is not deteriorated.

The optical element as a subject of the present invention is a lens, a prism, a transparent plate, a transparent rod, or the like.

According to the present invention, there is further provided an optical element washing machine as a dry type washing machine which can be used in the contamination removing stage in the above optical element manufacturing method, comprising an optical element holding unit, an excimer laser unit, and a focal control unit for focusing laser beam from the excimer laser unit, the optical element holding unit having a holder, a rotation stage, and a three dimensional control stage, in which the holder is means for holding an optical element, the rotation stage is means for causing the holder to rotate, the three dimensional control stage is a constitution element of position control means for causing the rotation stage to move in a vertical direction and/or a horizontal direction, the excimer laser unit is a light source for emitting ultraviolet radiation, and the focal control unit has basic control value setting means for setting a basic control value for a focal matching state of the ultraviolet radiation from the excimer laser unit, focal matching determination means for determining a focal matching state of the excimer laser light, and correction means for sending a correction amount corresponding to a determination result of the focal matching determination means to the position control means.

The basic control value setting means is means for setting the basic control value provided to hold the focal matching state of the excimer laser light within an acceptable range. The focal matching determination means is means for determining whether the excimer laser light is focused or not, that is, whether the focal matching state is in the acceptable range or not. The correction means is means for sending a moving amount of the lens in a vertical direction as a correction value to a lens position control means so as to hold the focal matching state within the acceptable range, in the case where the excimer laser light is not focused, that is, in the case where the focal matching state is outside the acceptable range. At this time, a moving speed of the lens in a horizontal direction is determined by the relation to a washing rate. When the lens is moved in the vertical direction and/or the horizontal direction, simultaneously it is again determined whether the excimer laser light is focused or not. The determination of the focal matching state, sending of the correction value based on the determination result, and moving of the lens in accordance with the correction value are repeated such that the focal matching state of the excimer laser light is always kept. Note that known structures can be applied to the structures of the respective means composing the laser light focal control unit.

BRIEF DESCRIPTION OF THE DRAWINGS

In the accompanying drawings:

FIG. 3 is a schematic view of a projection exposure apparatus using an optical element manufactured by the method of FIG. 1 as an optical system.

DESCRIPTION OF THE PREFERRED EMBODIMENTS

Figure 1:
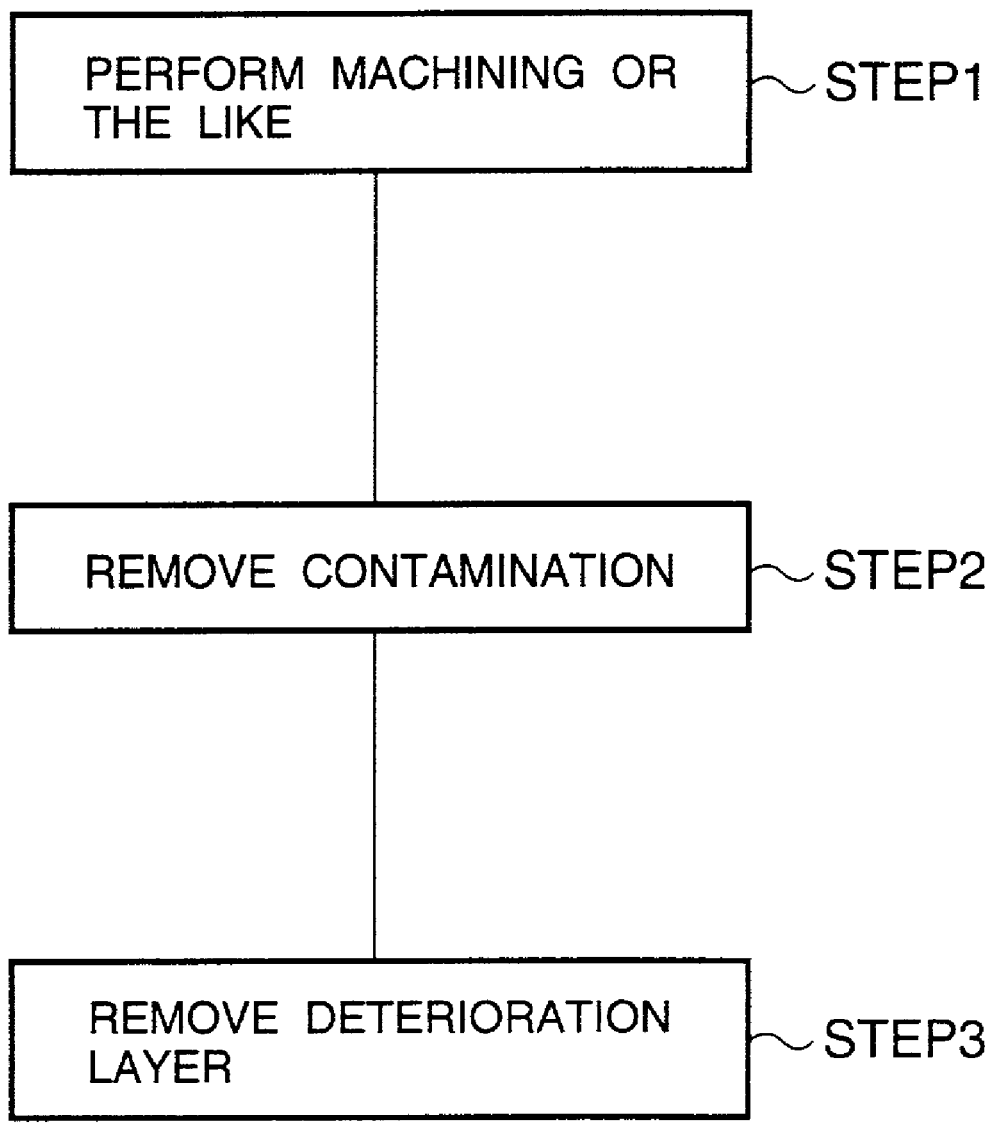
FIG. 1 is a flowchart of a manufacturing method according to the present invention.

FIG. 1 is a flowchart of a manufacturing method of the present invention. In the drawing, a part or all of step 1 and step 2 can be simultaneously performed.

One aspect of the present invention is a method of washing a substrate made from a $CaF_2$ single crystalline substrate, including the steps of; polishing a surface of the $CaF_2$ single crystalline substrate with a predetermined surface shape, forming on the surface thereof a protective film, and then washing the substrate, and this aspect adopts a step of peeling the protective film from the substrate and then immersing the substrate into acetone, then, a step of taking out the substrate from the acetone and wiping the surface thereof with a paper containing diamond powder, then, a step of processing the surface of the substrate with solvent and then processing the substrate with $UV/O_3$, then, a step of ultrasonic-processing the substrate in a wash solution containing a surface-active agent, a step of ultrasonic-processing the substrate in pure water and then rinsing it with the pure water, and a step of drying the ultrasonic-washed substrate.

Now, in the machining step, first, a rough shape of an optical element is set using a material ($CaF_2$) of the lens and then a final surface shape and a final surface roughness are determined by polishing the substrate. Thus, a contamination produced in the machining step of the substrate is an inorganic material such as abrasive or foreign matter and an organic material such as oil, fingerprints, or the residue of a protective film. These contaminations are produced in respective machining steps by covalent bond, electrostatic force, van der Waals power or the like. Also, there is the case where a machining affecting layer or a deterioration layer can be formed in a minute region near the surface by machining in a polishing step. This deterioration layer becomes a layer for absorbing light with a short wavelength, such as ultraviolet radiation.

Next, after the final surface shape and the final surface roughness of the optical element are determined, an antireflective film for improving the transmittance is formed on the surface of the substrate. Therefore, after the above machining step is completed, a final washing before the formation of the antireflective film becomes very important. In particular, with respect to, for example, a lens for an excimer laser used in lithography of an ultraviolet region, the transmittance approximate to a theoretical value is required. Thus, the final washing after the lens machining becomes very important.

Thus, according to this aspect of the present invention, in order to obtain a sufficient washing effect in the final washing after the lens machining, the above washing step is adopted.

That is, of the organic material residue, the inorganic particle, and the deterioration layer, which are left on the surface of the substrate after the machining, first, the organic material residue is removed by immersing in acetone for a long time. Further, the surface of the substrate is wiped with a paper containing diamond powder. Thus, most of what are adhered onto the surface of the substrate and cannot be removed by only acetone immersing, can be removed. Then, the organic material residue is completely removed by $UV/O_3$ processing.

As a result, the surface of the $CaF_2$ substrate after the $UV/O_3$ processing completely indicates hydrophilic property. Since the surface of the $CaF_2$ substrate indicates the hydrophilic property, the surface of the $CaF_2$ substrate is further ultrasonic-processed in an aqueous wash solution containing a surface-active agent. The surface of the $CaF_2$ substrate is slightly etched by water, and thus the deterioration layer can be removed. However, when the ultrasonic processing is further added, an etching operation is accelerated. If the aqueous wash solution is in contact with the $CaF_2$ substrate for a long time, the roughness of the surface of the substrate is deteriorated. Thus, etching is made in an etching condition (strength and time in ultrasonic processing) that the surface roughness is not deteriorated.

As described above, the surface of the $CaF_2$ substrate is etched by the aqueous wash solution. Thus, the inorganic particle and the deterioration layer can be removed from the surface of the substrate by the ultrasonic processing with this aqueous wash solution for a predetermined time.

That is, in this aspect, of light absorption layers adhered to the surface of the lens, the organic material residue is removed by the acetone immersing, the wiping with the paper containing diamond powder, and the $UV/O_3$ processing. The deterioration layer is removed in addition to the inorganic particle by the ultrasonic processing in the aqueous wash solution.

A manufacturing method according to a second aspect of the present invention has, as a stage of removing a contamination from the surface of a substrate while keeping a crystal structure in the surface of a $CaF_2$ single crystalline substrate, a step of removing the contamination from the surface of the substrate with laser light irradiation, and further includes a stage of ultrasonic-washing the surface of the substrate with an aqueous wash solution.

As described above, in a machining step, first, an optical element substrate with a rough shape is cut from a material. Then, a final surface shape and a final surface roughness are obtained by polishing the substrate.

A contamination produced in the machining step is, basically, an inorganic material such as abrasive or foreign matter and an organic material such as oil or fingerprints. These contaminations are produced in respective machining steps by covalent bond, electrostatic force, van der Waals power or the like. After the final surface shape and the final surface roughness of the optical element are determined, an antireflective film for improving the transmittance is formed on the surface of the substrate. Therefore, final washing after the above machining step becomes very important. In particular, with respect to, for example, an optical element for an excimer laser used in a lithography of a ultraviolet region, a very high transmittance is required. Thus, the final washing after the machining step becomes very important.

In the present invention, it is also important to remove the organic material in this washing step. However, in order to improve the transmittance of the substrate after the washing to a theoretical value, the inventor(s) considered that another light absorption factor must be removed. That is, there is, as a light absorption factor which has not been greatly studied so far, the existence of the deterioration layer produced on the surface of the $CaF_2$ substrate in polish-machining the substrate. In the present invention, a washing method of further removing this deterioration layer is provided to improve the transmittance of the substrate after the washing to the theoretical value.

According to a second aspect of the present invention, as a method of removing the contamination from the surface of the substrate while keeping the crystal structure in the surface of the substrate, the surface of the substrate is processed with laser light irradiation (dry washing method) and further ultrasonic-washed with the aqueous wash solution. Here, as a laser light irradiation condition, laser light energy is set to be within a range such that $CaF_2$ crystal structure as material is kept.

When the surface of the $CaF_2$ substrate is washed by such a dry washing method, a very effective result is obtained with respect to an organic material contamination on the surface of the substrate. In this dry washing method, ultraviolet radiation with a high intensity obtained by a pulsed laser, a continuous wave laser, or a high energy lump can be used.

In particular, when the surface of the optical element substrate is irradiated with a pulsed excimer laser, the organic material is instantly gasified and scattered from the surface of the substrate by its energy to make the washing. However, when the transmittance of the optical element is actually examined, in the case where the surface of the substrate is irradiated with, for example, KrF excimer laser light having a wavelength of 248 nm in order to make the dry washing, it is found that the transmittance of the optical element (substrate) does not reach the theoretical value.

Thus, in this second aspect, the substrate which has been irradiated with such high energy light is further ultrasonic-washed with the aqueous wash solution for a predetermined time to improve the transmittance. When the processing is performed with the aqueous wash solution for a long time, the $CaF_2$ substrate is affected to deteriorate the surface and to cause a degradation in the surface roughness. Thus, this ultrasonic washing is made for a length of time which does not involve a degradation in the surface roughness to remove the deterioration layer on the surface of the substrate.

That is, the organic material adhered to the surface of the substrate is almost scattered from the surface of the substrate by the high energy light irradiation. However, the deterioration layer left on the surface of the substrate cannot be removed. Therefore, after the surface of the substrate is irradiated with high energy light, the surface of the substrate is ultrasonic-washed with the aqueous wash solution to slightly etch the surface of the $CaF_2$ substrate, and thus the deterioration layer is removed.

This has been ascertained by experiments as described below. In particular, when the ultrasonic washing with the aqueous wash solution is added, etching efficiency is improved. Thus, if this processing is performed for a short time, the surface of the substrate can be etched without producing the surface deterioration of the substrate and the degradation in the surface roughness thereof. As a result, the deterioration layer left on the surface of the substrate is simultaneously removed.

First Embodiment (First Aspect)

First, as a sample, a parallel plate which is cut from the $CaF_2$ single crystalline substrate and has $\phi$ 30×2t and in which both surfaces are polished is used. Note that a material in which internal absorption is 0.2% or less is used.

A plurality of such substrates to be used are processed with respective different conditions and then transmittance in a wavelength of 193 nm is examined. The surface roughness is measured by an AFM measurement apparatus and an average roughness is examined with RMS. Polishing is made using diamond abrasive.

If the $CaF_2$ substrate is left in the air, the surface thereof is deteriorated by moisture, $CO_2$, other impurities in the air. Thus, a protective film is formed after polishing. For preparation of washing, this protective film is peeled, and then the sample is immersed in acetone for two hours and pulled from the acetone. Here, both surfaces of the sample are wiped with a Clint paper containing diamond powder.

While observing the surface of the sample using a slide star, the surface is finished with solvent (ether). Then, this sample is processed with $UV/O_3$. A processing time is five minutes, a distance between the surface and a light source is 30 mm, and an irradiation intensity is 12 $mW/cm^2$. With this state, the sample made of $CaF_2$ completely indicates hydrophilic property.

After that, the ultrasonic processing is performed with a dilution solution for two minutes, which contains a surface-active agent (neoclean, produced by Yokohama Resin) indicating alkalescent at 1%. Note that ultrasonic power is 1 kW and its frequency is 40 kHz (ultrasonic washing machine is produced by Shimada Rika Kogyo K. K.)

Further, using pure water, the ultrasonic processing is performed with the same condition as in the surface-active agent, and rinse processing is performed in pure water for 30 seconds. Then, the lens is dried with warm air to remove moisture.

With respect to the sample processed under this condition, the final transmittance at 193 nm was 92.20%. This value is equal to theoretical transmittance of $CaF_2$, and thus ideal cleanliness is obtained. The surface roughness of this sample was 0.5 nm (RMS). This surface roughness is not changed in comparison with the value before washing. That is, the degradation in the surface roughness by the wash etching step is not produced.

Second Embodiment (First Aspect)

As a sample, a parallel plate which is cut from the $CaF_2$ single crystalline substrate and has $\phi$ 30×2t and in which both surfaces are polished is used. Note that a material in which internal absorption is 0.2% or less is used.

A plurality of such substrates to be used are processed with respective different conditions and then transmittance in a wavelength of 193 nm with respect to the processed respective samples is examined. The surface roughness is measured by an AFM measurement apparatus and an average roughness is examined with RMS. Polishing is made using diamond abrasive. As in First Embodiment, after a protective film is peeled, the sample is immersed in acetone for an hour and pulled from the acetone.

Here, the sample is wiped with a clint paper containing diamond powder. While observing the surface of the sample using a slide star, the surface is finished with solvent (ether). Then, this sample is processed with $UV/O_3$.

A processing time is five minutes, a distance between the surface and a light source is 30 mm, and an irradiation intensity is 12 $mW/cm^2$. In this state, the sample made of $CaF_2$ completely indicates hydrophilic property. Thus, the ultrasonic processing can be performed with a dilution solution for three minutes, which contains a surface-active agent (neoclean, produced by Yokohama Resin) indicating alkalescent at 0.5%. Note that ultrasonic power is 1 kW and its frequency is 40 kHz (ultrasonic washing machine is produced by Shimada Rika Kogyo K. K.).

Further, using pure water, the ultrasonic processing is performed in same condition as in the surface-active agent, and rinse processing is performed with the pure water for 30 seconds. Then, the sample is dried with a warm air to remove moisture. With respect to the substrate (sample) processed under this condition, the final transmittance at 193 nm was 92.18%. This value is approximately equal to theoretical transmittance of $CaF_2$, and thus ideal cleanliness is obtained. The surface roughness of this sample was 0.55 nm (RMS). Even in the case where the washing is made under this condition, a reduction in the surface roughness is not caused.

When a method of manufacturing an optical element cut from the $CaF_2$ single crystalline substrate, according to First and Second Embodiments described above, is used, it can be recognized that, with respect to the transmittance characteristic in an excimer laser wavelength band of, in particular, a wavelength of 200 nm or less, good reproducibility and the transmittance approximate to the theoretical transmittance are obtained in comparison with a conventional case. Also, there is an effect that use of acetone as solvent can be suppressed to very small amount. As a result, the improvement of production yield of the optical element can be expected and the optical element can be stably produced, and thus the cost can be reduced. Further, the above manufacturing method is effective in view of environmental protection.

Third Embodiment (Second Aspect)

Figure 2:
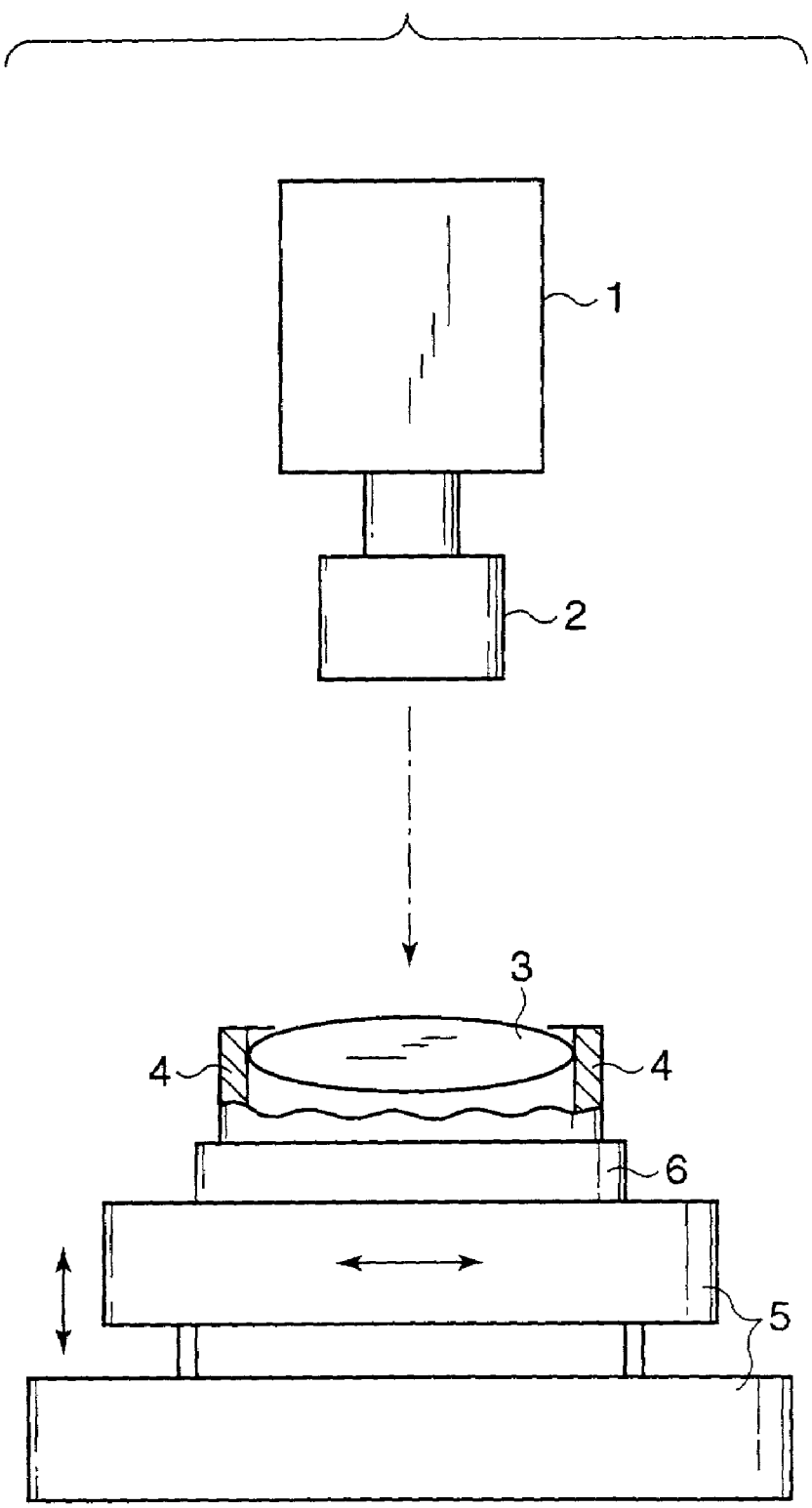
FIG. 2 is a schematic view of a lens washing machine used in the present invention.

FIG. 2 is a schematic view of a lens washing machine with laser irradiation, which is used in Third Embodiment and Fourth Embodiment described later. First, abrasive, oil content, other foreign matter, which are adhered due to the polishing process onto the surface of a lens 3 (outer diameter is 200 mm, curvature radius is 250 mm, convex lens, lens material is $CaF_2$) are wiped in advance to remove most soil.

Next, this lens 3 is held by a lens holder 4 in the washing machine shown in FIG. 2. In order to completely wash an effective portion of the lens, this lens holder 4 has a structure that is in contact with only rim (edge) portions of the lens 3. The lens holder 4 is supported such that it can be three-dimensionally actuated by a three dimensional control stage 5 or rotated by a rotation stage 6.

Generally, an outline of most lenses is a circle, and its shape becomes point-symmetric with the center of the lens. Thus, the lens holder 4 is rotated about an optical axis (center axis) of the lens 3. In this embodiment, while the lens 3 is rotated at a rotation rate of 10 rpm, dry wash processing is performed.

With the lens 3 being rotated, KrF excimer laser light (wavelength is about 248 nm, beam diameter is 12×32 mm$^2$) with energy of 300 mJ/cm$^2$ is irradiated from an excimer laser apparatus (produced by Lambda Physics Co., Ltd as LPX200) composed of a light source 1 and a focal control unit 2, the irradiation position being shifted at a velocity of 2 mm/sec. from the center portion of the lens 3 in the direction of the radius thereof. At this time, the height of the lens 3 in the optical axis direction is adjusted by the focal control unit 2 and the three dimensional control stage 5 such that the laser beam is always focused on the surface of the lens 3. Note that a repeat frequency of the pulse laser light is 200 Hz. As described above, after the surface of the lens 3 is irradiated with the KrF excimer laser, the ultrasonic processing is performed with a solution at 1 kW for two minutes, which contains a surface-active agent (semiclean, produced by Yokohama Resin) at 1% (ultrasonic washing machine is used with an oscillation frequency of 40 kHz). Then, using pure water, the ultrasonic processing is performed as described above at 1 kW for two minutes. Finally, rinse processing is performed in pure water, and then drying is made with warm air to finish the surface of the lens 3.

According to examination results by a high-powered microscope, a spectroscope, or the like, it is recognized that the abrasive, the foreign matter, and the organic material residue can be almost removed. It is recognized that the final lens transmittance in 193 nm becomes the theoretical value.

Fourth Embodiment (Second Aspect)

As in Third Embodiment, first, abrasive, oil content, other foreign matter, which are adhered due to the polishing process onto the surface of a lens (outer diameter is 250 mm, curvature radius is 280 mm, concave lens, lens material is $CaF_2$) are wiped in advance to remove most soil. Next, this lens is held by a lens holder in the washing machine. In order to completely wash an effective portion of the lens, this lens holder has a structure that is in contact with only rim (edge) portions of the lens.

As in Third Embodiment, in the case where this concave lens is washed, since a shape of the lens is point-symmetric with the center of the lens, dry wash processing is also performed while this concave lens is rotated about the optical axis (center axis) of the lens. Also in this embodiment, this lens is rotated at a rotation rate of 10 rpm. In this state, while KrF excimer laser light (wavelength is 248 nm, beam diameter is 12×32 mm$^2$) with energy of 250 mJ/cm$^2$ is irradiated from an excimer laser apparatus (produced by Lambda Physics Co., Ltd as LPX200), the irradiation position is shifted at a velocity of 2.5 mm/sec. from the center portion of the lens 3 in the direction of the radius.

Also in this case, the height of the lens in the optical axis direction is adjusted by the focal control unit 2 and the three dimensional control stage 5 such that the laser beam is always focused on the surface of the lens. Note that a repeat frequency of the pulse laser light is 150 Hz. The contamination left on the surface of the lens was instantly and substantially gasified or scattered from the surface of the lens by the laser light irradiation.

As described above, after the surface of the lens is irradiated with the KrF excimer laser, the ultrasonic processing is performed with a solution at 1 kW for three minutes, which contains a surface-active agent (semiclean, produced by Yokohama Resin) at 0.5% (ultrasonic washing machine is used with an oscillation frequency of 40 kHz). Then, using pure water, the ultrasonic processing is performed at 1 kW for three minutes. Finally, rinse processing is performed with the pure water, and then drying is made with warm air to finish the surface of the lens.

According to examination results by a high-powered microscope, a spectroscope, or the like, it is recognized that the abrasive, the foreign matter, and the organic material residue can be almost removed.

It is recognized that the final transmittance of this concave lens becomes the theoretical value.

According to Third and Fourth Embodiments described above, a lens washing machine of dry washing type is used. Thus, a wash solution such as organic solvent may be greatly reduced or may be not almost used. Also, since the detergency is large, the lens with very high transmittance in the ultraviolet region is obtained.

FIG. 3 is a schematic view of a projection exposure apparatus using an optical element manufactured by the manufacturing method of the present invention described above as an optical system. In FIG. 3, a circuit pattern of a mask 8 is illuminated with excimer laser light having a wavelength of 193 nm or 157 nm from an illuminating optical system 7. This pattern is imaged on a wafer 10 by a projection optical system 9. Note that the exposed wafer 10 is developed and processed by etching in order to manufacture a device.

As described above, the present invention can improve the transmittance of the optical element.

What is claimed is:

1. A method of manufacturing an optical element, comprising the stages of:
    machining a substrate;
    removing a contamination from a surface of the substrate after the machining; and
    removing a deterioration layer in the surface of the substrate after the machining,
    wherein the contamination removing stage includes the steps of:
    (a) immersing the substrate in acetone;
    (b) taking out the substrate from the acetone and then wiping the surface thereof with a paper containing diamond powder;
    (c) processing the wiped surface of the substrate with solvent; and
    (d) processing the surface-processed substrate with UV/$O_3$.

2. A method according to claim 1, wherein the substrate is made of $CaF_2$ single crystal.

3. A method according to claim 1, wherein the deterioration layer removing stage includes a step of ultrasonic-washing the surface of the substrate with an aqueous wash solution.

4. A method according to claim 3, wherein in the ultrasonic washing step, ultrasonic washing with a wash solution containing a surface-active agent and ultrasonic washing with pure water are performed in succession.

5. A method according to claim 4, wherein the deterioration layer removing stage further includes a step of rinsing the substrate with pure water and a step of drying the rinsed substrate after the surface of the substrate is ultrasonic-washed with pure water.

6. A method according to claim 1, wherein the solvent is ether.

7. A method according to claim 4, wherein the surface-active agent is an alkalescent surface-active agent.

8. A method according to claim 5, wherein the drying step is performed with warm air.

9. A method according to claim 1, wherein the machining stage includes a step of cutting the substrate from a $CaF_2$ single crystalline base substrate and polishing the surface of the cut substrate with a predetermined surface shape.

10. A method according to claim 9, wherein the machining stage includes a step of forming a protective film on the polished surface of the substrate, and the contamination removing stage is performed after the protective film is removed from the surface of the substrate.

11. A method according to claim 1, wherein the contamination is one of abrasive, oil content, and other foreign matter.

12. A method according to claim 1, wherein a surface roughness of the optical element is 0.5 to 0.55 nm by an examination with an RMS.

13. A method according to claim 1, wherein the optical element is one of a lens, a prism, a transparent plate, and a transparent rod.

* * * * *

UNITED STATES PATENT AND TRADEMARK OFFICE
CERTIFICATE OF CORRECTION

PATENT NO. : 6,984,334 B2 Page 1 of 1
APPLICATION NO. : 09/873999
DATED : January 10, 2006
INVENTOR(S) : Hiroyuki Suzuki It is certified that error appears in the above-identified patent and that said Letters Patent is hereby corrected as shown below:

Title page,
Item [30], Foreign Application Priority Data, "2001/172213" should read -- 2000-172213 --; "2000/172214" should read -- 2000-172214 --; and "2001/170785" should read -- 2001-170785 --.

Column 1,
Line 39, "a ultrasonic" should read -- an ultrasonic --.

Column 3,
Line 20, "steps of;" should read -- steps of: --.

Column 4,
Line 60, "a ultraviolet" should read -- an ultraviolet --.

Column 5,
Line 22, "lump" should read -- lamp --.

Signed and Sealed this

Eleventh Day of July, 2006

JON W. DUDAS
*Director of the United States Patent and Trademark Office*